United States Patent Office 2,709,190
Patented May 24, 1955

2,709,190

PROCESS FOR PREPARING FLUOROCARBONS BY REACTING CARBON AND A METAL FLUORIDE

Mark W. Farlow, Holly Oak, and Earl L. Muetterties, Hockessin, Del., assignors to E. I. du Pont de Nemours & Company, Wilmington, Del., a corporation of Delaware No Drawing. Application April 7, 1954,
Serial No. 421,704

11 Claims. (Cl. 260—653)

This invention relates to a new process for preparing compounds of fluorine and carbon.

Compounds containing only carbon and fluorine (hereinafter referred to as fluorocarbons for the sake of brevity) possess considerable usefulness in many fields of applied chemistry. They have demonstrated utility as dielectrics, intermediates for plastics, refrigerant liquids, ingredients of insecticidal compositions, e. g., as propellants, etc. In particular, tetrafluoroethylene has achieved commercial success in the form of its polymer.

This invention has as an object the provision of a new process for preparing fluorocarbons. Other objects will appear hereinafter.

These objects are accomplished by the present invention wherein carbon is reacted at a temperature of at least 1000° C. with a binary fluoride of a metal of groups IV–B, V–B and VI–B of the periodic table as the sole halogen-contributing reactant, said metal being within the atomic number range 22–74.

The periodic table referred to in this discussion is that published in Deming's "Chemical Chemistry," 5th ed., John Wiley & Sons, publishers. This table is used in many other reference books, such as the "Handbook of Chemistry and Physics," 30th ed. (1947), published by the Chemical Rubber Publishing Co. Thus the fluorides suitable for the purpose of this invention are those of the following metals: titanium, zirconium, hafnium, vanadium, niobium, tantalum, chromium, molybdenum, and tungsten. They can be employed singly or two or more such binary fluorides can be employed. In the fluorides employed in the process of this invention fluorine is the only negative element.

The process of this invention is conveniently carried out by heating an intimate mixture of carbon and the metal fluoride in a suitably disposed apparatus to a temperature of at least 1000° C., and passing the gaseous reaction products through cold condensers to liquefy the fluorocarbons. If desired, a stream of inert gas such as nitrogen is passed through the reactor to help remove the gaseous reaction products. Another mode of operation consists in dropping the molten metal fluoride onto finely divided carbon heated to the reaction temperature in a suitable reactor, or subliming or distilling the metal fluoride over the hot carbon. In still another and preferred embodiment, the metal fluoride is reacted with the carbon electrodes of a carbon arc, where the temperature is estimated to be in the range of 2500 to 3500–4000° C. or perhaps even higher. This can be done, for example, by immersing the arc in the molten metal fluoride, or, if the fluoride is sufficiently volatile, by forcing its vapors through the carbon arc, which for this purpose is conveniently designed with one or both of its electrodes hollow.

For practical purposes, a temperature of at least 1000° C. is necessary. The reaction temperature can be as high as can practically be obtained by known means. Extremely high temperatures, such as those that can be achieved by use of the carbon arc, represent a desirable embodiment since they often lead to high conversions to the extremely valuable tetrafluoroethylene. With more conventional equipment, temperatures in the range of 1200 to 2000° C. are preferred.

Any form of carbon, whether amorphous or crystalline, is suitable for the purpose of this invention. Thus, there can be used coal, graphite, charcoal, the various forms of carbon black such as lamp black, acetylene black, gas black, channel black, bone black, etc. At the lower temperatures, e. g., 1000–2000° C. the best results are obtained with active carbon, of which many well known varieties are available commercially. In general, active carbon is very finely divided, porous carbon having a total surface area of at least 20 square meters per gram [Hassler, "Active Carbon," Chemical Publishing Co. (1951), p. 127]. When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

The inorganic fluorides suitable for the purposes of this invention, i. e., the fluorides of the metals of groups IV–B, V–B and VI–B of the periodic table, can be prepared by methods described in the literature, or are available commercially. Some of these fluorides, e. g., the fluorides of tungsten and chromium, are obtainable without having to resort to the use of free fluorine, and are therefore more readily and economically accessible than the fluorides of other metals.

Both reactants, that is, the carbon and the inorganic fluoride, should preferably be substantially anhydrous, although the reaction can tolerate the presence of some water. Thus, those fluorides which normally contain water of crystallization should be dehydrated prior to use. It is also often desirable to dehydrate the carbon prior to reaction, since carbon, especially of the active or absorbent variety, can retain significant amounts of water even at high temperature.

While the relative proportions of the two reactants are not critical insofar as the course of the reaction is concerned, it is desirable for economic reasons to have the carbon present in excess, in order to utilize as much as possible of the more expensive inorganic fluoride. Thus, it is preferred to use the two reactants in such proportions that there is present at least 0.25 gram atom, preferably between 1 and 5 gram atoms, of carbon per gram atom of fluorine. There can be used up to 20 gram atoms of carbon per gram atom of fluorine or even more.

The reaction usually gives a mixture of fluorocarbons, of which the preponderant constituent at the lower reaction temperatures is carbon tetrafluoride, with lesser amounts of other saturated fluorocarbons, e. g., the perfluorinated hydrocarbons from ethane to pentane. When the carbon arc is used, tetrafluoroethylene is a substantial part, or even the major part, of the reaction product. In addition, the crude reaction product may contain some unreacted inorganic fluoride, which can be recycled. In some cases at least, the element whose fluoride was employed is liberated as the free metal in a high state of purity, thus constituting a valuable by-product of the process. The fluorocarbons can be isolated, for example, by passing the gaseous reaction mixture through cold condensers and fractionating the condensate through suitable distilling columns. If desired, the gaseous reaction product can be circulated through cold baffles to retain any material which is solid at that temperature, or it can be passed through liquid scrubbing solutions to separate the unchanged inorganic fluoride and other by-products formed during the reaction. It is usually desirable to effect rapid cooling of the reaction products to avoid side reaction or polymerizations at the high temperatures used. This is particularly the case when very high temperatures, as in the carbon arc, are employed. In such cases, and especially if tetrafluoroethylene is desired as the principal reaction product, very rapid quenching of the reaction mixture is recommended.

The reaction can be carried out at any desired pressure, which normally is atmospheric pressure but can be higher or lower. Reduced pressures of the order of 1–50 mm. of mercury are preferred when using the electric arc. The reaction is, of course, desirably carried out in an inert atmosphere substantially free from agents, such as oxygen or halogens other than that contributed by the metal fluoride, which would attack the carbon at the operating temperature.

The invention is illustrated in greater detail by the following examples, in which parts are by weight unless otherwise specified.

Example I

A reactor tube lined with a nickel-iron-molybdenum alloy was charged with about 30 parts of carbon black and heated at 1100° C. for several hours while a slow stream of nitrogen was passed through it to remove the moisture. A train of two receivers was then attached to the exit end of the reactor, the first one of which was cooled with a carbon dioxide-acetone mixture and the second one with liquid nitrogen. A total of 80 parts of tungsten VI fluoride, which boils at 19° C. and is therefore a gas under normal conditions, was passed during 1.75 hours through the reactor maintained at 1100° C. The first receiver contained unreacted tungsten VI fluoride; the condensate in the second one contained carbon tetrafluoride.

Example II

An intimate mixture of 25 parts of chromium II fluoride and 20 parts of carbon black, the latter having previously been dried at 1000° C., was placed in a tubular nickel reactor. A slow stream of nitrogen was passed through the tube, which was connected to a receiver cooled with liquid nitrogen. The tube was heated to 1000° C. and held in the temperature range of 1000–1200° C. for 2 hours. The material condensed in the cold trap contained carbon tetrafluoride.

Example III

A nickel tube packed with 30 parts of carbon black was heated to 1100° C. while a slow stream of nitrogen was passed through it to remove the moisture. A receiver cooled with liquid nitrogen was attached to the exit end of the tube, and a nickel tray containing 32 parts of vanadium V fluoride was quickly inserted at the other end of the tube, which was then again closed. The vanadium V fluoride was sublimed by local heating through the hot part of the tube containing the carbon black. When the sublimation was complete, the condensate in the cold trap contained unreacted vanadium V fluoride and fluorocarbons consisting primarily of carbon tetrafluoride, with some hexafluoroethane. Spectrographic analysis of the residual carbon black in the reactor showed that it contained vanadium.

Example IV

In this example, tungsten VI fluoride was reacted with the carbon electrodes of a carbon arc as follows: The anode was a solid ⅛ inch graphite cylinder, mounted on a copper tube having perforations near the end holding the anode to permit entrance of the reactant gas in the reaction chamber. The cathode was a hollow graphite cylinder, ⁵⁄₁₆ inch outside diameter and ³⁄₁₆ inch inside diameter, through which the gaseous reaction product escaped and from which it was led to a system of cold condensers similar to that of Example I. The anode was positioned with its end nearly flush with the open end of the cathode. The electrodes were mounted in a water-cooled, gas-tight glass jacket which was flushed with argon prior to operation and evacuated to a pressure of a few millimeters of mercury.

The arc was operated at a voltage of 24–26 volts and a direct current of 20–21 amperes. The pressure on the inlet side of the arc was 8 mm. and that on the outlet side of the arc 6 mm. A total of 5.3 parts of tungsten VI fluoride was passed through the arc during 15.5 minutes. There was collected in the second cold trap 0.6 part of condensate, which contained, on a molar basis, 30% tetrafluoroethylene and 20% carbon tetrafluoride, with a small amount of hexafluoroethane. This corresponds to a conversion of 11.8% to fluorocarbons. Metallic tungsten was deposited on the anode as a by-product of the reaction.

While this process has been illustrated above with reference to certain specific metal fluorides, the process of the present invention is generic to the reaction, at a temperature of at least 1000° C., of carbon with any binary fluoride of a group IV–B, V–B or VI–B metal of atomic number between 22 and 74. The fluorides of these metals in any of their valence states can be used. Of these fluorides, the preferred ones are titanium IV fluoride, vanadium V fluoride, chromium II fluoride, molybdenum VI fluoride and tungsten VI fluoride, and particularly the last named one which is a very low boiling liquid, and therefore well adapted for use in this process.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of fluorocarbons wherein carbon is reacted, at a temperature of at least 1000° C., with, as essentially the sole source of halogen, tungsten VI fluoride.

2. The process for the preparation of fluorocarbons wherein carbon is reacted, at a temperature of at least 1000° C., with as essentially the sole source of halogen, chromium II fluoride.

3. The process for the preparation of fluorocarbons wherein carbon is reacted, at a temperature of at least 1000° C., with, as essentially the sole source of halogen, vanadium V fluoride.

4. The process for the preparation of fluorocarbons wherein carbon is reacted, at a temperature of at least 1000° C., with, as essentially the sole source of halogen, a binary fluoride of a group V–B metal within the atomic number range 22–74.

5. The process for the preparation of fluorocarbons wherein carbon is reacted, at a temperature of at least 1000° C., with, as essentially the sole source of halogen, a binary fluoride of a group VI–B metal within the atomic number range 22–74.

6. The process for the preparation of fluorocarbons wherein carbon is reacted, at a temperature of at least 1000° C., with, as essentially the sole source of halogen, a binary fluoride of a B family metal of groups IV to VI of the periodic table within the atomic number range 22–74.

7. The process for the preparation of fluorocarbons which comprises reacting carbon, at a temperature of at least 1000° C., with, as essentially the sole source of halogen, a binary fluoride of a metal of atomic number within the range 22–74 and from groups IV–B, V–B, and VI–B of the periodic system.

8. The process for the preparation of fluorocarbons which comprises reacting carbon, at a temperature of at least 1000° C., with, at essentially the sole source of halogen, one or more binary fluorides of a metal of atomic number within the range 22–74 and from groups IV–B, V–B, and VI–B of the periodic system.

9. The process for the preparation of fluorocarbons which comprises reacting carbon of a carbon arc, at a temperature of at least 1000° C., with, as essentially the sole source of halogen, one or more binary fluorides of a metal of atomic number within the range 22–74 and from groups IV–B, V–B, and VI–B of the periodic system.

10. Process for the production of tetrafluoroethylene wherein carbon is reacted, at a temperature of at least 2500° C., with, as essentially the sole source of halogen, a binary fluoride of a B family metal of groups IV to VI of the periodic table within the atomic number range 22–74.

11. Process according to claim 6 wherein carbon is reacted, at a temperature of at least 2500° C., with the binary fluoride, the reaction products are very rapidly quenched, and the tetrafluoroethylene is isolated.

References Cited in the file of this patent
UNITED STATES PATENTS

| | | |
|---|---|---|
| 1,996,115 | Lazier | Apr. 2, 1935 |
| 2,407,129 | Benning et al. | Sept. 3, 1946 |
| 2,456,027 | Simons | Dec. 14, 1948 |
| 2,684,987 | Mantell et al. | July 27, 1954 |